(No Model.)
O. F. FARWELL.
TIRE MARKER.
No. 519,249. Patented May 1, 1894.
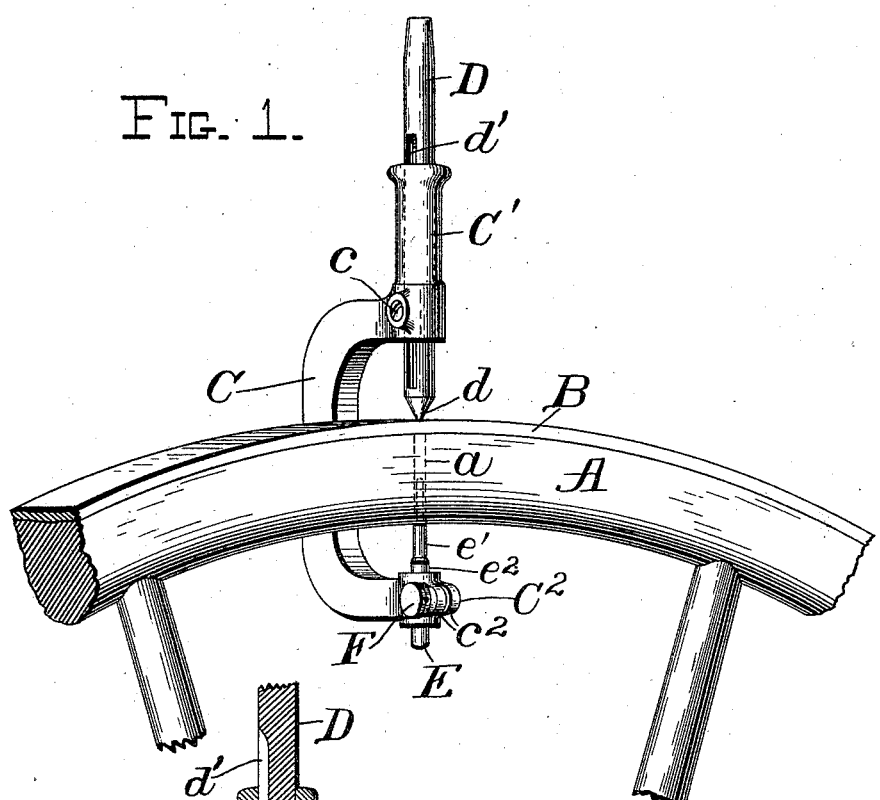
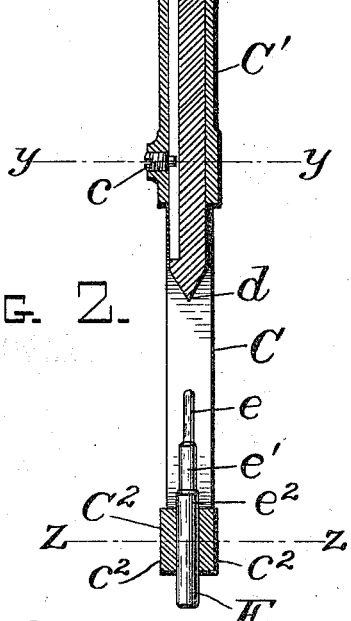
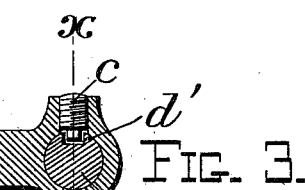
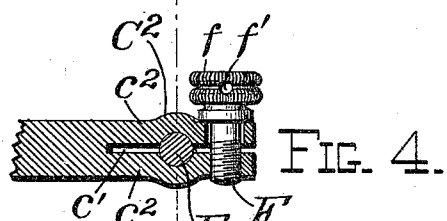
Witnesses
Percy C. Bowen
John C. Wilson
Inventor
O. F. Farwell,
By Whitman & Wilkinson,
Attorneys

UNITED STATES PATENT OFFICE.

OSCAR F. FARWELL, OF WOODSTOCK, VERMONT, ASSIGNOR TO THE WILEY & RUSSELL MANUFACTURING COMPANY, OF GREENFIELD, MASSACHUSETTS.

TIRE-MARKER.

SPECIFICATION forming part of Letters Patent No. 519,249, dated May 1, 1894.

Application filed January 27, 1894. Serial No. 498,223. (No model.)

*To all whom it may concern:*

Be it known that I, OSCAR F. FARWELL, a citizen of the United States, residing at Woodstock, in the county of Windsor and State of Vermont, have invented certain new and useful Improvements in Tire-Markers; and I do hereby declare the following to be a full, clear, and exact description of the invention, such as will enable others skilled in the art to which it appertains to make and use the same.

My invention relates to improvements in tire markers. In putting tires on wheels, especially new tires on old wheels, it becomes important to mark the tire at exactly the proper points for drilling the hole in the same for the bolt securing the tire to the fellies, and it was for the purpose of so marking the tire that the hereinafter described device was designed.

Reference is had to the accompanying drawings, in which the same parts are indicated by the same letters throughout the several views.

Figure 1 represents a perspective view of a part of the wheel showing the tire marker in position. Fig. 2 represents a section of the tire marker along the line $x\,x$ of Figs. 3 and 4. Fig. 3 represents a section of the tire marker along the line $y\,y$ of Fig. 2, and Fig. 4 represents a section of the tire marker along the line $z\,z$ of Fig. 2.

A represents the fellies of the wheel, B the tire, which it is desired to mark to correspond with the hole $a$ already bored in the fellies.

The tire marker C is curved outward in the shape of a flat U, and is provided with two arms or horns C' and $C^2$. The former in the shape of a hollow sleeve, adapted to receive the center-punch D which is pointed as at $d$, and is longitudinally slotted at at $d'$ to receive the inner end of the screw $c$. The opposite horn of the frame C is slotted as at $c'$ to form the resilient arms $c^2$, which are grooved interiorly to receive the centering piece E, which centering piece is clamped between the said arms by the clamp screw F having milled head $f$, and holes $f'$ to receive the point of a small bar or a wire nail, or the like, whereby said screw may be turned for clamping the two arms $c^2$ firmly upon the centering piece. The centering piece E is preferably made in the form of a plurality of concentric cylinders such as $e$, $e'$, and $e^2$, whereby the device is made adaptable to the varying sizes of bolt holes commonly found in wheels, and also greater rigidity is obtained.

The operation of the device is as follows:— The centering piece E is centered in the hole $a$ in the felly, and then the center-punch D is slipped down until it touches the face of the tire. A light blow then struck on the top of the center-punch D marks the center of the hole to be drilled into the tire.

Having thus described my invention, what I claim, and desire to secure by Letters Patent of the United States, is—

In a tire marker, the combination with the frame C provided with the arm C' having the hollow sleeve and screw $c$ secured therein; and the arm $C^2$ bifurcated as at $c'$; of the center punch D slotted as at $d'$ to receive said screw $c$; the centering piece E, mounted in said bifurcated arm $C^2$; and the clamp screw F for clamping said centering piece in place, substantially as and for the purposes described.

In testimony whereof I affix my signature in presence of two witnesses.

OSCAR F. FARWELL.

Witnesses:
FREDK. C. SOUTHGATE,
GEO. W. PAINT.